(12) United States Patent
Munk-Bogballe

(10) Patent No.: US 12,538,907 B2
(45) Date of Patent: Feb. 3, 2026

(54) APPARATUS AND METHOD FOR INSECT BREEDING

(71) Applicant: INSECTUM APS, Tjele (DK)

(72) Inventor: David Munk-Bogballe, Tjele (DK)

(73) Assignee: INSECTUM APS, Tjele (DK)

( * ) Notice: Subject to any disclaimer, the term of this patent is extended or adjusted under 35 U.S.C. 154(b) by 0 days.

(21) Appl. No.: 18/253,489

(22) PCT Filed: Nov. 17, 2021

(86) PCT No.: PCT/EP2021/081962
§ 371 (c)(1),
(2) Date: May 18, 2023

(87) PCT Pub. No.: WO2022/106455
PCT Pub. Date: May 27, 2022

(65) Prior Publication Data
US 2024/0008462 A1    Jan. 11, 2024

(30) Foreign Application Priority Data

Nov. 23, 2020   (EP) ..................................... 20209217

(51) Int. Cl.
*A01K 67/30*   (2025.01)
(52) U.S. Cl.
CPC .................................... *A01K 67/30* (2025.01)
(58) Field of Classification Search
None
See application file for complete search history.

(56) References Cited

U.S. PATENT DOCUMENTS

| 3,156,541 | A | * | 11/1964 | Kalke | .................. B65D 88/742 |
| 3,580,549 | A | * | 5/1971 | Murphy | .................... B01F 7/00 |
| | | | | | 259/102 |
| 4,293,854 | A | * | 10/1981 | Gookins | ................ G06B 21/00 |
| | | | | | 340/615 |
| 2002/0144658 | A1 | | 10/2002 | Holcombe et al. | |

(Continued)

FOREIGN PATENT DOCUMENTS

| CN | 203754620 U | 8/2014 |
| CN | 208113681 U | 11/2018 |

(Continued)

OTHER PUBLICATIONS

International Search report for PCT/EP2021/081962, prepared by the European Patent Office, mailing date Mar. 3, 2022, 3 pages.

(Continued)

*Primary Examiner* — Joshua J Michener
*Assistant Examiner* — Henry Hooper Mudd
(74) *Attorney, Agent, or Firm* — Brooks Kushman P.C.

(57) ABSTRACT

An apparatus and method for breeding insects, preferably larvae, and/or hatching insect eggs. The apparatus having: a housing adapted to have a mass of insects and/or insect eggs and nourishment, at least one beam being moveably mounted on the upper part and/or substantially in the centre of the housing, at least one substantially vertically oriented auger suspended from the beam, the auger being rotatable and adapted to stir the mass of insects and nourishment in the housing, a perforated floor, and an air supply providing an airflow through the perforated floor into the housing.

15 Claims, 3 Drawing Sheets

(56) References Cited

U.S. PATENT DOCUMENTS

| | | | |
|---|---|---|---|
| 2009/0290962 A1* | 11/2009 | Fisher | B66F 11/00 |
| | | | 414/287 |
| 2011/0132278 A1 | 6/2011 | Robinson, Jr. | |
| 2013/0196423 A1 | 8/2013 | Bryan-Brown | |
| 2022/0183261 A1* | 6/2022 | Gray | A01K 61/54 |

FOREIGN PATENT DOCUMENTS

| | | |
|---|---|---|
| CN | 109315298 A | 2/2019 |
| CN | 210841218 U | 6/2020 |
| CN | 210869466 U | 6/2020 |
| JP | S58134933 A | 8/1983 |
| JP | H05506356 A | 9/1993 |
| JP | 2004181379 A | 7/2004 |
| KR | 102114733 B1 | 5/2020 |
| KR | 20200078208 A | 7/2020 |
| WO | 2015164240 A1 | 10/2015 |
| WO | 2018169398 A1 | 9/2018 |

OTHER PUBLICATIONS

Japanese Office Action for Japanese Patent Application No. 2023530532 mailed May 21, 2025. 4 pages.

Chinese Office Action for CN Application No. 202180089569.8, prepared by the Chinese Patent Office, mailing date Sep. 30, 2025, 11 pages.

* cited by examiner

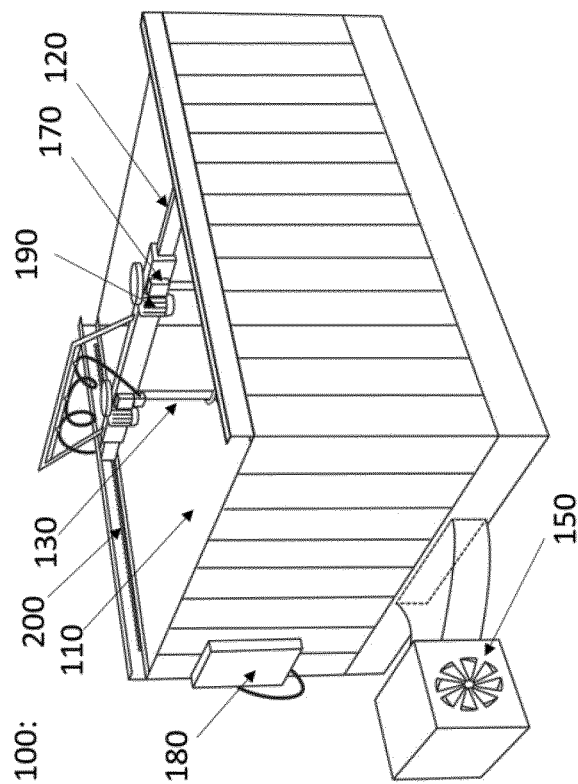
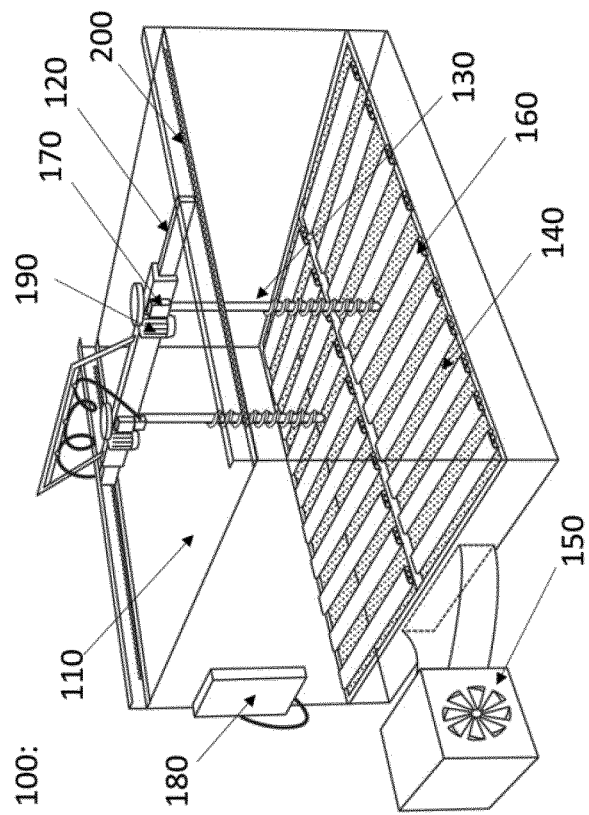
FIG. 1b
FIG. 1a

APPARATUS AND METHOD FOR INSECT BREEDING

CROSS-REFERENCE TO RELATED APPLICATION

This application is the U.S. national phase of PCT Application No. PCT/EP2021/081962 filed on Nov. 17, 2021, which claims priority to EP patent application No. 20209217.7 filed on Nov. 23, 2020, the disclosures of which are incorporated in their entirety by reference herein.

FIELD OF THE INVENTION

The present invention relates to an apparatus and a method for large-scale breeding of insects, preferably larvae, and/or hatching of insect eggs. The apparatus and method of the invention is securing an effective and safe technique of breeding insects on a large-scale. The apparatus of the invention comprises a housing adapted to comprise a large mass of insects and/or insect eggs.

BACKGROUND OF THE INVENTION

Due to the increase in the world population and the continuing rise in standards of living across the globe, there is a dramatically growing demand for protein and lipids. The farming of insects can play an important role in satisfying that demand as an integrated part of the global food production system. For insect farming to matter, however, there is a need for cost-efficient, effective large-scale breeding systems.

When breeding insects, in particular the larvae of *Tenebrio Molitor* and *Hermetia Illucens*, temperature, humidity, airflow and acidity play a crucial role.

Today, larvae are typically reared either in shallow ground-level pools cast in concrete or in small boxes preferably stacked on top of each other. Normally the boxes are made of polymer or wood. In the pools and boxes, the larvae grow directly in their feed and frass. Due to the heat generated by the larvae when feeding as well as due to the requirement of larvae to breathe, the total thickness of the layer of larvae, frass, feed and eventual bulking agents cannot exceed a certain limit since too thick a layer will see the larvae overheat, suffocate or grow sub-optimally. Scaling up production in these systems, then, involves the casting of more concrete pools, which requires the taking into use of additional floor space, or the stacking of more boxes on top of each other.

The cleaning, filling, feeding, moving, stacking, monitoring and emptying of boxes is very time consuming if done manually complicated and extensively cost intensive to automate. The management of concrete pools is less expensive but the approach requires tremendous amounts of floor space to match the production capacity that uses space vertically and is thus inefficient.

Hence, an alternative more efficient and more economical method and apparatus for breeding/rearing larvae and/or hatching eggs that is simple to produce and operate and that uses space vertically would be highly advantageous.

OBJECT OF THE INVENTION

It is an object of the present invention to provide an alternative to the prior art.

In particular, it may be an object of the present invention to provide an insect breeding apparatus and associated method that solve the above mentioned problems of the prior art of using small boxes or shallow ground-level pools cast in concrete for the breeding insects.

SUMMARY OF THE INVENTION

Thus, the above-described object and several other objects are achieved in a first aspect of the invention by providing an apparatus for breeding insects and/or hatching insect eggs, preferably larvae, the apparatus comprising:
a housing adapted to comprise a mass of insects and/or insect eggs, nourishment and a bulking agent,
at least one beam moveably mounted on the upper part and/or substantially in the centre of the housing,
at least one substantially vertically oriented auger suspended from the beam, the auger being rotatable and adapted to stir the mass of insects and/or insect eggs, nourishment and a bulking agent in the housing,
a perforated floor, and
an air supply providing an airflow through the perforated floor into the housing.

The invention is particularly, but not exclusively, advantageous for obtaining an apparatus for breeding insects that are optimal for large-scale breeding of insects. The apparatus provided by the invention is very time and cost saving relative to known breeding systems, also there is provided an apparatus wherein it is very easy to monitor the eggs and insects. Furthermore, the insect breeding machine provides a more efficient, economical and/or reliable apparatus.

In addition, the invention is particularly, but not exclusively, advantageous since the process required for the cleaning of the machine is easy and quick to complete, as only one area has to be cleaned and not a lot of small boxes or pools.

Also, the invention is particularly, but not exclusively, advantageous in that it provides an air supply system that can cool the insects, supply the insects with oxygen, and dry the mass in the housing, prior to the housing being emptied.

In the context of the present invention, an 'insect' may be understood as any one of an insect class of arthropods. The insect may be in any of its life-stages: egg, larva, pupa or hatched.

In the context of the present invention, a 'housing' may be understood as any possible arrangement that can accommodate the mass of insects and nourishment. The housing is not restricted to any specific shape. The housing can be in the shape of a box like a container, in the shape of a cylinder like a silo or any other preferred shape. The housing can furthermore be made in any preferred material e.g. metal, polymer, wood, etc. The housing might be made in a transparent material, so that a view into the mass is made possible. The potential view into the container allows observation of the development of the insects. Preferably, the housing is made as a regular container. Depending on the species, insects will spend anything from 3 to 70 days in the housing. At the end of this period, they will have grown to harvest size.

In the context of the present invention, a 'mass' may be understood as the mixture of at least insect and nourishment that is held in the container when breeding the insects. The mass can comprise other content than only the insects, the nourishment and the bulk agent, but usually the insects and the nourishment are the main parts of the mass in addition to frass and bulking agents. In the bottom of the housing there might be a suitable bottom-mass not being a mass of insects and nourishment, but a mass of bulking agent e.g. wood shavings.

The beam is provided as a movable cross-member to achieve a gantry-like arrangement having a frame structure raised on side supports so as to span over the mass underneath. On the beam, the augers as well as other types of processing equipment may be provided.

In the context of the present invention, an 'auger' may be understood as any or various tools or devices with a helical shaft. The auger may be any auger being suitable for conditioning the mass by stirring and distributing the mass within the housing.

In the context of the present invention, 'perforated' may be understood as having perforations e.g. holes, wherein there is an opening for air into the housing. The perforations being in any preferred shape e.g. substantially circular, substantially rectangular, elongated as e.g. a stripe, etc. The perforations preferably being made in a series/pattern of holes.

In the context of the present invention, terms like 'horizontal' and 'vertical' may be understood as directional terms in a broad sense. The terms are relative concepts and should not exclude that there may be an angle deviating from exact horizontal or exact vertical.

In an embodiment of the invention, the apparatus comprises at least one sensor for measurement of at least one or more of: temperature, humidity, pH-value and/or the height of the mass.

Preferably, a plurality of sensors are provided in and/or on the housing.

The embodiment is particularly, but not exclusively, advantageous for obtaining an insect breeding machine that ensures an optimal environment for the insects inside the housing. Also by providing a sensor for the height of the mass in the housing, the machine provides a secure environment outside the housing as the mass cannot exceed and fall out over the top of the housing without being sensed by the sensor.

Preferably, the measurement of the temperature, humidity and pH-value is via sensors positioned on the beam. In addition, the height of the layer in housing is preferably measured via a sensor positioned on the beam.

Furthermore, the humidity and temperature of the air supplied from the bottom is also measured by sensors.

In an embodiment of the invention the at least one sensor is connected to an alarm, the alarm being adapted to start if one or more predetermined thresholds are reached or exceeded. The embodiment is particularly, but not exclusively, advantageous for obtaining a secure environment inside and/or outside the housing. When one or more sensors are connected to an alarm system, it ensures that if one or more thresholds are reached or exceeded, a person is contacted and made aware of a potential fluctuation and can ensure a stabilization of the environments again after the potential fluctuation.

In an embodiment of the invention, the at least one beam is substantially horizontally movable on the upper part of the housing either directly moving on the top edges of the housing or moving on support rails mounted on and/or in the upper part of the housing. The embodiment is particularly, but not exclusively, advantageous for obtaining a machine that provides a plurality of solutions of how to position the beam. Depending on the shape and size of the housing, the movement of the beam might vary in design in order to ensure optimal efficiency.

In an embodiment of the invention, the beam is provided with a feeding and/or watering system made up of hoses and nozzles for the effective distribution of liquid and nourishment. The embodiment is particularly, but not exclusively, advantageous for obtaining a machine that includes tasks, which are normally performed by human interaction, robots or other complex systems. By providing a beam including a feeding and/or watering system, the breeding machine operates automatically and ensures that the insects within the housing get the water and nourishment they require without the need of manual labour. The feeding and watering from the beam is preferably done in a continuous manner and not just all at once.

In an embodiment of the invention, the at least one auger is substantially horizontally movable on the beam. The embodiment is particularly, but not exclusively, advantageous for obtaining a breeding machine that provides an optimal stirring of the mass within the housing. The stirring both ensures that especially the lower part of the mass in the housing is not reaching too high a temperature, and that the bottom mass is not being too compressed. Also, the stirring ensures that the fresh air and the nourishment are distributed evenly in the housing.

In an embodiment of the invention, the at least one auger is a raising auger rotated in a direction to lift the mass of insects and nourishment. The embodiment is particularly, but not exclusively, advantageous for obtaining a rotation of the augers in an upwards direction and thereby moving around the mass in the housing, thus avoiding overheating in the bottom of the container and a good distribution of the feed is obtained.

In an embodiment of the invention, the apparatus comprises a plurality of augers mounted on one or more beams. The embodiment is particularly, but not exclusively, advantageous for obtaining an even more optimal distribution of air and nourishment as more augers can stir more mass at the same time.

In an embodiment of the invention, the perforated floor is a movable floor, preferably configured as an endless belt or the like, or the floor is fixed with an endless belt with scrapers capable of moving across said floor for the purpose of emptying the housing. The embodiment is particularly, but not exclusively, advantageous for obtaining an easy and controlled emptying of the housing. When the housing is being emptied, the movement of the floor will be controlled to ensure the amount of mass being emptied from the housing is in accordance with the mass that can be handled outside the housing depending on the equipment available outside the housing and/or number of persons available to handle the emptied mass of insects. Furthermore, the embodiment is particularly, but not exclusively, advantageous for providing an emptying of the breeding machine in a way where all the mass of the housing is led to the opening for emptying in an easy way. There are no corners where large quantities of mass can get stuck as the whole floor is made as at least one movable belt moving towards the opening of the housing or, alternatively, a movable belt with scrapers moving towards the opening of the housing is fitted onto the perforated floor.

In the context of the present invention, an 'endless belt' may e.g. be understood as a continuous belt preferably traveling around a set of pulleys.

In an embodiment of the invention, at least one side, top or bottom of the housing is acting as at least one door, such as a vertically slidable door, or is provided with at least one door, such as a door with hinges, for providing an opening adapted for emptying the housing.

The embodiment is particularly, but not exclusively, advantageous for obtaining a breeding machine of which an easy emptying of the housing is made possible.

In the context of the present invention, a 'door' may be understood as an opening allowing for the mass to be filled into the housing and for emptying the housing. The emptying of the housing may be done by vacuuming or sweeping from above e.g. from the beam. The vacuuming may be done via a hose extending from the beam or via a separate system. Moreover, preferably the walls of the housing can also be opened as on a regular container e.g. with doors on hinges.

In an embodiment of the invention, the top and/or bottom is closed and/or open. The embodiment is particularly, but not exclusively, advantageous for obtaining a breeding machine using as little construction materials as possible thereby reducing material costs.

Furthermore, the embodiment is particularly, but not exclusively, advantageous for allowing the heat from the mass inside the housing to be released especially though the top and thereby prevent overheating which more easily might be an issue within a closed housing unless other preventive measures have been taken. Preferably the lower part of the housing is constructed as a "double bottom", where the upper part of the double bottom is perforated e.g. a fixed perforated floor or a moveable, perforated endless belt. The lower part of the double bottom may be an actual bottom of the housing or a (concrete) floor on which the housing with either a fixed perforated floor or a floor in shape of an endless, moveable, perforated belt is placed. Basically, it is found advantageous that air pressure can be generated between the two layers of the double bottom, so that the air is forced up through the perforations into the housing.

In an embodiment of the invention, the housing has a box-shape comprising at least four sides, and wherein the top and/or bottom is closed and/or open. The embodiment is particularly, but not exclusively, advantageous for obtaining a breeding machine that can easily be made of e.g. a container or the like or can easily be manufactured.

In an embodiment of the invention, the housing has a cylindrical shape which is circular at the top and the bottom, and wherein the top and/or bottom is closed and/or open. The embodiment is particularly, but not exclusively, advantageous for obtaining a breeding machine without corners.

In an embodiment of the invention, the floor is divided into sections, preferably by using transverse bars and more preferably moving transverse bars. The embodiment is particularly, but not exclusively, advantageous for obtaining an easy and controlled emptying of the house. When the house is being emptied, the movement of the floor or the endless belt placed above the fixed, perforated floor will be controlled to ensure the amount of mass being emptied from the housing is in accordance with the mass that can be handled outside the housing depending on the equipment available outside the housing and/or number of persons available to handle the emptied mass of insects.

By providing a floor divided into sections, it becomes even easier to control the emptying of the housing as the sections of the floor provide an indication of how much mass to be emptied at one time, e.g. one sections at a time, two sections at a time, and so on.

In an embodiment of the invention, the apparatus comprises at least one stabilizing element for stabilizing the housing. The embodiment is particularly, but not exclusively, advantageous for obtaining a stabilized and resilient housing even though the housing is filled with a mass, which contributes to a huge force load on the walls of the housing.

In an embodiment of the invention, the apparatus comprises at least one drive means. The embodiment is particularly, but not exclusively, advantageous for providing means, which provide the movement of the features of the machine.

In the context of the present invention, 'drive means' may be understood as e.g. an motor (hydraulic, mechanical, electric, etc.). The drive means can be any suitable means for providing power to the apparatus and thereby providing the capacity of movements.

In an embodiment of the invention, the apparatus comprises a smaller separate container where the eggs can breed for a few days, where after the separate container with the now hatched larvae is emptied into the housing.

This provides a solution so that insect eggs can be directly fed into the housing.

In an embodiment of the invention, the housing is made of metal, in particular steel. The embodiment is particularly, but not exclusively, advantageous for providing a strong and stable housing, which is inexpensive to manufacture. However, the housing might be made of any other material suitable for the breeding machine. Potentially the housing might be made in a transparent material, such as polymer, acryl or any other material suitable for providing the necessary load-strength.

In an embodiment of the invention, the apparatus is a "plug-and-play" solution. The embodiment is particularly, but not exclusively, advantageous for obtaining an easy solution for transportation, delivery and setup of the breeding machine as all the needed elements of the machine come in one overall part that is to use immediately.

In an embodiment, one or more ship containers are converted into a breeding machine, where the entire system is mounted inside, so that it can be shipped out and used as a plug and play.

The invention further relates to a second aspect being a method for breeding insects, the method comprising the steps:
 filling a housing with insects and nourishment,
 rotating at least one auger while moving on a movable beam,
 supplying air into the housing through the bottom of the housing,
 continuing the steps until the larvae have grown to a predetermined stage,
  opening partly or fully one side, top or bottom of the housing or at least one door,
 emptying the housing.

This aspect of the invention is particularly, but not exclusively, advantageous in that the method according to the present invention may be implemented by using the breeding machine of the first aspect.

Furthermore, the invention is particularly, but not exclusively, advantageous for obtaining a method for breeding insects that are optimal for large-scale breeding of insects. The method provides a very timesaving method relative to known breeding methods; also, the method provides a very easy way to supervise the eggs and insects that are part of it.

Additionally, the insect breeding method constitutes a more efficient, economically and/or reliable method.

Furthermore, the invention is particularly, but not exclusively, advantageous in that it provides an air supply system that cools the insects, provides air for the insects and provides extra drying of the mass in the housing when the housing is to be emptied.

In the context of the present invention, a 'stage' may be understood as any stage in the life cycle of an insect.

In an embodiment of the invention, the augers are constantly rotating or the augers are rotating in sequences or intermittently and the flow of air through the perforated floor is constant or the inflow of air is in sequences or intermittent.

In an embodiment of the invention, the larvae are sorted from the nourishment and any other surrounding material, e.g. insect frass, after the housing is emptied. The embodiment is particularly, but not exclusively, advantageous for obtaining sorted fractions containing only the grown larvae, only frass etc.

In an embodiment of the invention, the emptying is performed by one or more of:
  empty the housing by starting a movement of a movable floor (140) of the housing (S6) or of a fixed floor with the endless belt with scrapers that move across the perforated floor, or,
  empty the housing by means of a suction blower, or
  empty the housing by means of a loader, or
  empty the housing by tipping the housing.

In an embodiment of the invention, the emptying of the housing is performed in steps according to a distance of transverse bars positioned at the bottom of the housing.

The embodiment is particularly, but not exclusively, advantageous for obtaining an easy and controlled emptying of the house. When the house is being emptied, the movement of the floor will be controlled to ensure the amount of mass being emptied from the housing is in accordance with the mass that can be handled outside the housing depending on the equipment available outside the housing and/or number of persons available to handle the emptied mass of insects.

By emptying the housing in accordance with the divided sections of the floor, it become even more easy to control the emptying of the housing as the sections of the floor provide an indication of how much mass to be emptied at one time, e.g. one sections at a time, two sections at a time, and so on.

In an embodiment of the invention, the at least one door is opened so that the space under the perforated floor can be emptied and cleaned via blowing air in from one side. The embodiment is particularly, but not exclusively, advantageous in that it enables a cleaning process of the bottom of the machine that is very easy and quickly completed.

In an embodiment of the invention, the eggs are also located in the housing so that they can hatch directly into the mass with nourishment, or the eggs are positioned in a separate smaller housing that is part of the apparatus, where the eggs can hatch, after which the smaller housing with the newly hatched larvae is emptied into the housing of the apparatus. The embodiment is particularly, but not exclusively, advantageous for providing a solution where the hatching of eggs and the breeding/rearing of larvae are possible.

The first and second aspect of the present invention may each be combined with any of the other aspects. These and other aspects of the invention will be apparent from and elucidated with reference to the embodiments described hereinafter.

BRIEF DESCRIPTION OF THE FIGURES

The apparatus and method for breeding insects according to the invention will now be described in more detail with regard to the accompanying figures. The figures show one way of implementing the present invention and is not to be construed as being limiting to other possible embodiments falling within the scope of the attached claim set.

FIGS. 1a and 1b schematically show a box-shaped apparatus for breeding insects.

DETAILED DESCRIPTION OF AN EMBODIMENT

Figure 2A:
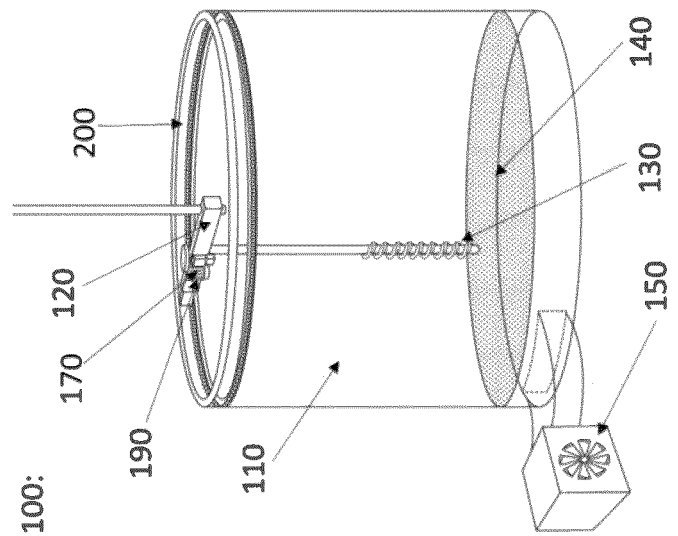
FIGS. 2a, 2b and 2c schematically show a cylinder-shaped apparatus for breeding insects.

FIGS. 1a and 1b schematically show a box-shaped apparatus 100 for breeding insects according to one presently preferred embodiment of the invention. FIGS. 1a and 1b illustrate an apparatus 100 for breeding insects, preferably larvae, and/or hatching insect eggs.

The apparatus comprises:
  A housing 110 adapted to comprise a mass of insects and/or insect eggs and nourishment. The housing illustrated in the figures is box-shaped, built like a container. The housing comprises four sides, a bottom and an open top. By the invention the top and/or bottom can be closed and/or open.
  At least one beam 120 being moveably mounted on the upper part of the housing 110. The figure shows one beam mounted on the upper part of the housing, but a plurality of beams are also suitable for the invention depending on the size of the housing. The beam 120 in FIGS. 1a and 1b is (substantially) horizontally movable on the upper part of the housing via support rails 200 mounted in the upper part of the housing. In addition, the beam 120 could be directly moving on the top edges of the housing. Moreover, the beam can comprise a feeding and/or watering system (not shown in FIG. 1).
  At least one substantially vertically oriented auger 130 suspended from the beam 120, the auger being rotatable and adapted to stir the mass of insects and nourishment in the housing 110. In FIGS. 1a and 1b, two augers 130 are positioned on the beam. The augers are horizontally movable on the beam 120. In addition, the augers are raising augers 130 being rotated in a direction to lift the mass of insects and nourishment.
  A perforated floor 140. The perforated floor illustrated in FIGS. 1a and 1b is perforated with circular holes. The holes can be in any shape and in any suitable pattern. The holes may be provided by embossing or similar methods of manufacture.
  An air supply 150 providing an airflow through the perforated floor 140 into the housing 110. The perforated floor is a movable floor, preferably configured as an endless belt or the like. Also, in FIG. 1a the floor 140 is divided into sections, preferably by using transverse bars 160.

The apparatus illustrated in FIGS. 1a and 1b also comprises at least one sensor 170. In the figures two sensors 170 are illustrated both positioned on the beam 120. The sensors can be positioned anywhere in and/or on the housing 110 e.g. on the beam 120, on the side/bottom/top of the housing, on the augers 130 or at any other suitable position in and/or on the housing. The sensors 170 are suitable for measurement of at least one or more of: temperature, humidity, pH-value and/or the height of the mass. The sensor(s) is preferably connected to an alarm 180 as illustrated in FIGS. 1a and 1b. The alarm 180 is adapted to start if one or more predetermined thresholds are reached or exceeded.

Furthermore, the apparatus 100 illustrated in FIGS. 1a and 1b has an open top adapted for emptying the housing. The apparatus of the invention has at least one side, top or bottom of the housing, which comprises at least one door or which is acting as a door (not illustrated in FIG. 1). The door can be a vertically slidable door or a door with hinges (not illustrated in FIG. 1), for providing an opening adapted for emptying the housing. Also, the apparatus illustrated in FIGS. 1a and 1b comprises drive means 190 providing the movement of the features of the apparatus.

Figure 2B:
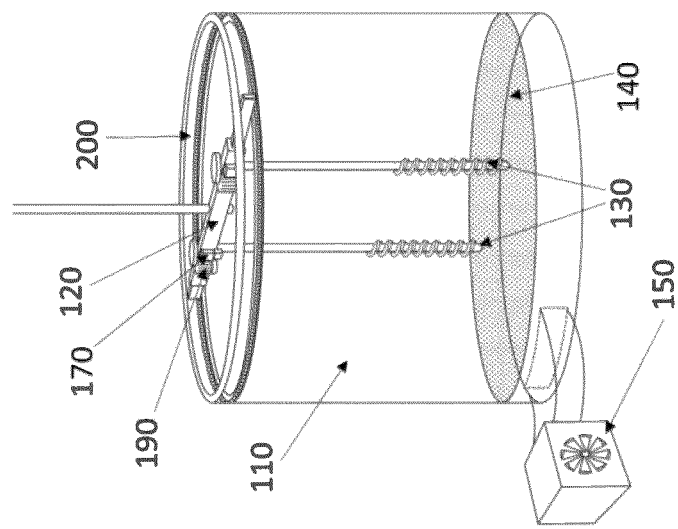
Figure 2C:
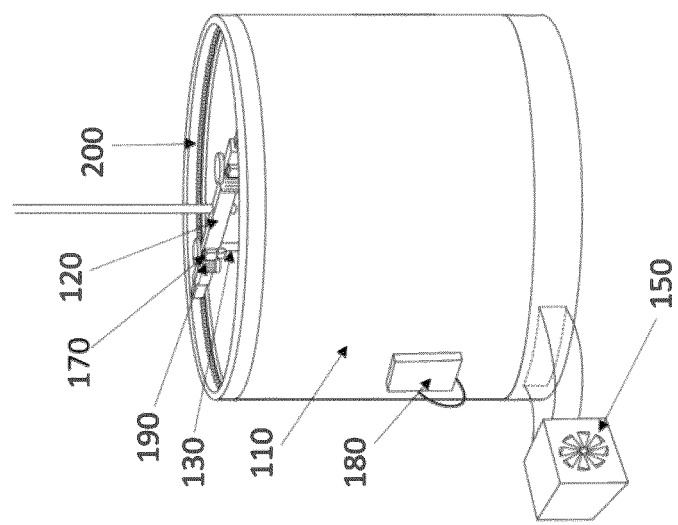

FIGS. 2a, 2b and 2c schematically show a cylinder-shaped apparatus 100 for breeding insects according to another presently preferred embodiment of the invention.

The apparatus shown in FIG. 2 illustrates an apparatus for breeding insects, preferably larvae, and/or hatching insect eggs. The apparatus comprises:

A housing 110 adapted to comprise a mass of insects and/or insect eggs and nourishment. The housing illustrated in FIGS. 2a, 2b and 2c is cylinder-shaped, built as a silo. The housing comprises a circular sidewall, a bottom and an open top. Within the invention, the top and/or bottom can be closed and/or open.

At least one beam 120 being moveably mounted on the upper part and/or in the centre of the housing. The FIGS. 2a, 2b and 2c show one beam 120 mounted (substantially) in the centre of housing. The beam can be either through-going raised and movable on side supports so as to span over the working area (the mass underneath) or only be partially straddling the top of the housing and rotatably movable. The beam 120 in FIGS. 2a, 2b and 2c is movable on the upper part of the housing 110 via support rails 200 mounted in the upper part of the housing. Also, the beam could be directly moving on the top edges of the housing. Moreover, the beam can comprise a feeding and/or watering system (not shown in FIGS. 2a, 2b and 2c).

At least one substantially vertically oriented auger 130 suspended from the beam 120, the auger being rotatable and adapted to stir the mass of insects and nourishment in the housing 110. In FIG. 2a, one auger 130 is positioned on the beam. In FIGS. 2b and 2c, two augers 130 are positioned on the beam. The augers are horizontally movable on the beam. In addition, the augers are raising augers 130 that are rotated in a direction to lift the mass of insects and nourishment.

A perforated floor 140. The perforated floor illustrated in FIGS. 2a, 2b and 2c is perforated with circular holes. The holes could be in any shape and in any suitable pattern.

An air supply 150 providing an airflow through the perforated floor 140 into the housing 110.

Figure 3:
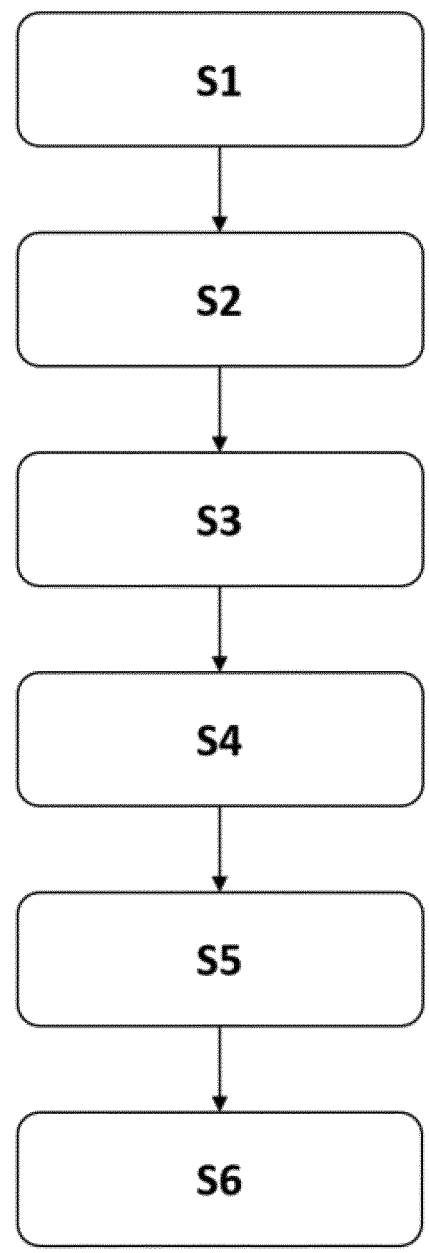
FIG. 3 shows a flow-chart of a method according to the invention for breeding insects.

FIG. 3 shows a flow-chart of a method according to the invention for breeding insects with the apparatus 100 (shown in FIGS. 1a, 1b, 2a, 2b and 2c). The method comprises the steps:

S1 Filling a housing 110 with insects and nourishment.
S2 Rotating at least one auger 130 which is movable on a movable beam (120).
S3 Supplying air into the housing from the bottom of the housing, preferably through the floor 140.
S4 Continuing the steps S2-S3 until the larvae have grown to a predetermined stage.
S5 Partially or fully opening one side, top or bottom of the housing or at least one door.
S6 Emptying the housing 110.

The above method according to the invention may be performed in this order, or in another order, possibly one or more steps may be combined as the skilled person will readily understand.

Furthermore, the augers 130 are constantly rotating or are rotating in sequences or intermittently and the supply of air is constant or the inflow of air is in sequences or intermittent.

Also, the larvae are preferably sorted from the nourishment and any other surrounding material, e.g. insect frass, after the housing 110 is emptied.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An apparatus for breeding insects, preferably larvae, and/or hatching insect eggs, the apparatus comprising:
   a housing adapted to comprise a mass of insects and/or insect eggs, nourishment and a bulking agent,
   at least one beam being moveably mounted on the upper part and/or substantially in the center of the housing,
   at least one substantially vertically oriented auger suspended from the at least one beam, the at least one auger being rotatable and adapted to stir the mass of insects and nourishment in the housing,
   a perforated floor,
   an air supply providing an airflow through the perforated floor into the housing, and
   wherein the at least one beam comprises a feeding and/or watering system.

2. The apparatus according to claim 1, wherein the apparatus comprises at least one sensor for measurement of at least one or more of: temperature, humidity, pH-value and/or the height of the mass.

3. The apparatus according to claim 2, wherein the at least one sensor is connected to an alarm, the alarm being adapted to start if one or more predetermined thresholds are reached or exceeded.

4. The apparatus according to claim 1, wherein the at least one beam is substantially horizontally movable on the upper part of the housing either via directly moving on the top edges of the housing or via support rails mounted on and/or in the upper part of the housing.

5. The apparatus according to claim 1, wherein the at least one auger is substantially horizontally movable on the at least one beam.

6. The apparatus according to claim 1, wherein the at least one auger is a raising auger rotated in a direction to lift the mass of insects and nourishment.

7. The apparatus according to claim 1, wherein the apparatus comprises a plurality of augers mounted on one or more beams.

8. The apparatus according to claim 1, wherein the perforated floor is a movable floor, or the perforated floor is fixed with an endless belt with scrapers capable of moving across said perforated floor for the purpose of emptying.

9. The apparatus according to claim 1, wherein at least one side, top or bottom of the housing is acting as at least one door or provided with at least one door for providing an opening adapted for emptying the housing.

10. The apparatus according to claim 1, wherein the top and/or bottom is closed and/or open.

11. The apparatus according to claim 1, wherein the housing has a box-shape comprising at least four sides, and wherein the top and/or bottom is closed and/or open.

12. A method for breeding insects, the method comprising the steps of:
  filling a housing with insects and nourishment,
  stirring the insects and nourishment in the housing by rotating at least one auger, and moving said at least one auger on a movable beam and moving said beam in the housing,
  supplying air into the housing from the bottom of the housing,
  continuing the steps of stirring by rotating and moving the at least one auger and the beam until the insects have grown to a predetermined stage,
  opening partly or fully one side, top or bottom of the housing or at least one door, and
  emptying the housing.

13. The method according to claim 12, wherein the at least one auger is constantly rotating or wherein the at least one auger is rotating in sequences or intermittently and wherein the supply of air is constant or wherein the inflow of air is in sequences or intermittent.

14. The method according to claim 12, wherein larvae are sorted from the nourishment and any other surrounding material after the housing has been emptied.

15. The method according to claim 12, wherein the step of emptying the housing includes
  emptying the housing by starting a movement of a movable floor of the housing or of a fixed floor with the endless belt with scrapers that move across the fixed floor, or,
  emptying the housing by means of a suction blower, or
  emptying the housing by means of a loader, or
  emptying the housing by tipping the housing.

* * * * *